(No Model.)
E. ONEILL.
STUMP EXTRACTOR.
No. 515,158.          Patented Feb. 20, 1894.
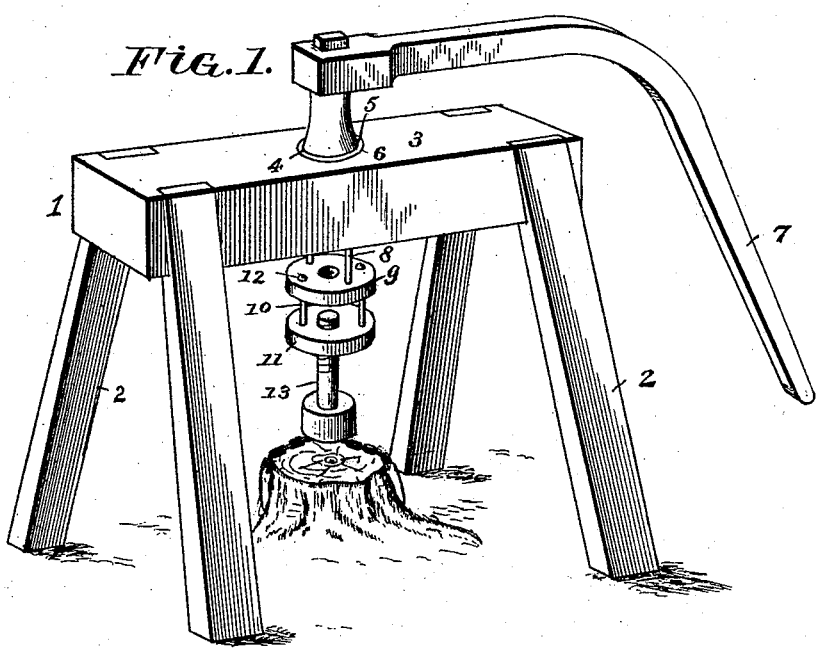
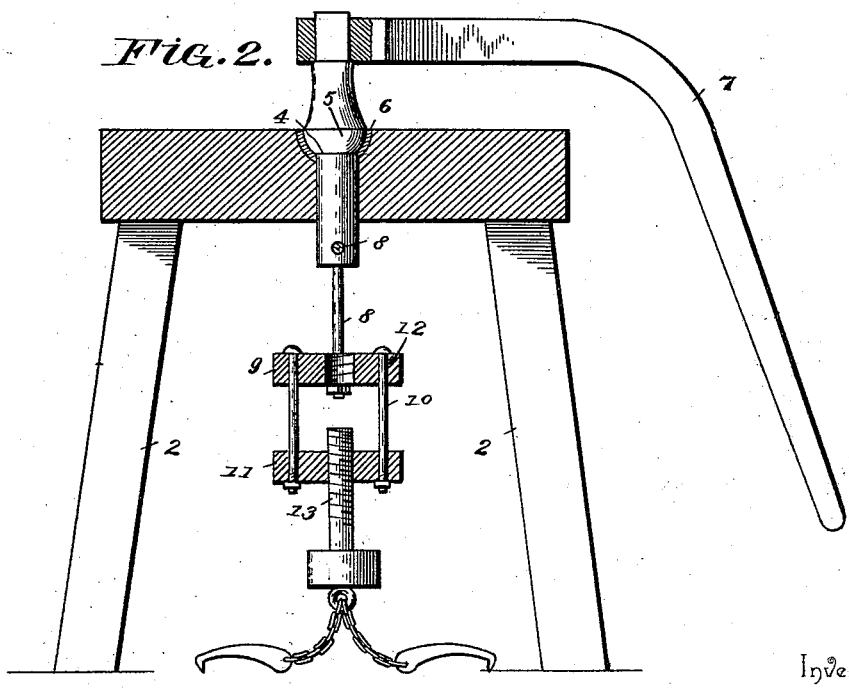
Witnesses
Inventor
Edward Oneill,
By his Attorneys.

UNITED STATES PATENT OFFICE.

EDWARD ONEILL, OF MITCHELL'S MILLS, PENNSYLVANIA.

STUMP-EXTRACTOR.

SPECIFICATION forming part of Letters Patent No. 515,158, dated February 20, 1894.

Application filed July 18, 1893. Serial No. 480,840. (No model.)

*To all whom it may concern:*

Be it known that I, EDWARD ONEILL, a citizen of the United States, residing at Mitchell's Mills, in the county of Indiana and State of Pennsylvania, have invented a new and useful Stump-Extractor, of which the following is a specification.

The invention relates to improvements in stump extractors.

The object of the present invention is to improve the construction of stump extractors, and to provide a simple and inexpensive one which will enable great force to be exerted on a stump at the expenditure of a small amount of power to enable stumps to be readily and quickly extracted.

The invention consists in the construction and novel combination and arrangement of parts hereinafter fully described, illustrated in the accompanying drawings and pointed out in the claims hereto appended.

In the drawings—Figure 1 is a perspective view of a stump extractor constructed in accordance with this invention. Fig. 2 is a vertical sectional view.

Like numerals of reference indicate corresponding parts in both figures of the drawings.

1 designates a supporting frame, composed of legs 2 and a top piece 3, which is provided with a central opening and in which is swiveled a vertical stem 4. The stem is provided between its ends with a collar or flange 5, having a convex lower face and arranged on a concave bearing plate or washer 6 secured upon the upper face of the top piece 3 of the supporting frame. The upper end of the stem has attached to it a sweep lever 7, and the lower end of the stem is provided with an eye, and has suspended from it an inverted U-shaped link 8, to which is secured an upper nut 9. The upper nut 9 has suspended from it by rods 10 a lower nut 11; the rods 10 have their lower ends secured to the lower nut 11, and their upper ends are loosely arranged in perforations 12 of the upper nut, and are provided with heads for securing them to the said upper nut. The lower nut is engaged by a screw 13, which is provided at its lower end with a grapple adapted to be connected to a stump to be extracted. In extracting the stump the sweep lever 7, which is curved to clear the supporting frame, is swung around the latter by hand or horse power, thereby drawing the screw 13 upward by means of the lower nut. When the screw has nearly passed through, or rather its threaded portion has passed through the lower nut, its upper end engages the upper nut, and further operation of the stump extractor causes a continued upward movement of the screw, the rods 10 being loosely connected with the upper nut, permitting the nuts to approach each other. This construction and arrangement of parts obviates the necessity of employing a large screw of great length, and a high supporting frame for accommodating the screw.

It will be seen that the stump extractor is simple and comparatively inexpensive in construction, and that it is capable of exerting a great amount of force at the expenditure of a small amount of power at the sweep lever, and that it is adapted for the rapid extraction of stumps.

Changes in the form, proportion and the minor details of construction may be resorted to without departing from the principle or sacrificing any of the advantages of this invention.

What I claim is—

1. In a stump extractor, the combination of a supporting frame, a vertical stem swiveled therein, a sweep lever connected to the stem, an upper nut suspended from the lower end of the stem, a lower nut supported and loosely connected with the upper nut and having its threaded opening aligned with that of the upper nut, and a screw adapted to engage successively the lower and upper nuts and provided with means for attaching it to a stump, substantially as described.

2. In a stump extractor, the combination of a supporting frame, a vertical stem swiveled therein, a sweep lever connected with the stem, an inverted U-shaped link suspended from the lower end of the stem, an upper nut secured to the lower end of the link and provided with opposite perforations, rods arranged in the perforations and provided with heads at their upper ends and loosely connected with the upper nut, a lower nut secured to and supported by the rods, and a
5 screw engaging the lower nut and provided with means for attaching it to a stump, substantially as described.

In testimony that I claim the foregoing as my own I have hereto affixed my signature in the presence of two witnesses.

EDWARD ONEILL.

Witnesses:
C. B. MUNSHOWER,
E. A. NICHOL.